Dec. 25, 1951        B. J. BROWN          2,580,156
AUTOMOBILE BODY CONSTRUCTION
Filed July 15, 1947                3 Sheets-Sheet 1

Dec. 25, 1951   B. J. BROWN   2,580,156
AUTOMOBILE BODY CONSTRUCTION
Filed July 15, 1947   3 Sheets-Sheet 2

INVENTOR.
Burton J. Brown
BY
Stanley Lightfoot

Dec. 25, 1951  B. J. BROWN  2,580,156
AUTOMOBILE BODY CONSTRUCTION

Filed July 15, 1947  3 Sheets-Sheet 3

INVENTOR.
Burton J. Brown
BY
Hauley Lightfoot

Patented Dec. 25, 1951

2,580,156

UNITED STATES PATENT OFFICE 2,580,156

AUTOMOBILE BODY CONSTRUCTION

Burton J. Brown, Detroit, Mich.

Application July 15, 1947, Serial No. 761,042

3 Claims. (Cl. 296—28)

This invention relates to automobile body frame construction and has as its object to provide for simplicity and light weight without the sacrifice of strength and in a manner which admits of the use of conventional structural channel and other standard sections which may be rolled or extruded and assembled into a unitary structure by the riveting or welding thereto of clip angles, gusset plates, or similar simple and well-known connecting devices.

A further object of the said invention is to provide such a structural body frame involving very low tooling expense and the use of inexpensive easily constructed assembly fixtures, and calling for little machining in preparing the members for assembly or in effecting their assembly.

Still further, the said invention has as an object to provide a car body frame characterized by the use of cantilever members attached to longitudinal members and forming the supports for upright and overhead channels secured to the outer ends of such cantilever members in a manner ensuring great body rigidity, the resulting unit being symmetrical and the upright and overhead body channels or ribs, when so secured to the cantilever members, forming therewith continuous channels having a definite radius defining the contour of the body.

The invention further contemplates that the body and roof frame fabrications be of Z type or similar rolled or extruded members riveted or welded to the outer legs of upright and overhead body channels thereby giving to the structure lateral stability and affording an adequate foundation for the outer covering of the body, this structure being of relatively great strength as compared with the conventional type of body frame heretofore in general use.

Still further, the said invention aims to provide a body frame construction of the type referred to wherein bending operations are resorted to almost exclusively as distinguished from the expensive forming operations ordinarily involved in car body frame construction.

A further object is to provide a fabricated body frame structure including a main frame as distinguished from a body structure adapted to be supported on the main frame wherein the floor line structure of said improved body frame includes an outer body frame defining the outer plan contour of the body to extend outwardly around the wheels of the car to which the body is to be applied and the main frame extending longitudinally of the body between the wheels of the first-mentioned outer frame support on the outer ends of the cantilever members extending laterally from said main frame.

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may adopt the novel construction and arrangement of parts hereinafter described, by way of example, having reference to the accompanying drawings, wherein:

Figure 5 is a fragmentary detail elevation of the right side of the car frame to illustrate provision for a door opening;

Figure 6 is a somewhat enlarged fragmentary detail view of that portion of the frame circumscribed by the broken line 6—6 in Figure 1; and Figure 7 is a similar detail view of that portion of the frame circumscribed by the broken line 7—7 in Figure 1.

Figure 8 is an enlarged detail view of the connection between body frame elements illustrated in Figure 1, taken on the line 8—8 thereof.

Similar characters of reference indicate similar lines in the several figures of the drawing.

For a clear understanding of the type of body which is contemplated by this invention, the location of the car wheels 10 has been indicated in broken lines, and it will be observed that the main frame of the body is formed by two longitudinal channel members 11 extending throughout the length of the body, between the wheel positions and decidedly inwardly of the side members of the body as will be further explained, 12 being cross members, also of channel section, acting as bracing for the longitudinal members 11 and secured together at their central meeting points, as by a plate 13, riveted or welded thereto according to convenience. These channels are preferably standard stock of either rolled or extruded type and any well known structural means, such as clip angles or gusset plates, may be employed in their assembly.

It is proposed that these longitudinal and cross members, as well as other structural members hereinafter referred to, be of aluminum suitably alloyed to afford the required strength and many such alloys having all the qualities necessary for the purposes of this invention, including resistance to corrosion and lending themselves to effective welding, are available on the market and well known in the art so that analytical specification thereof is deemed unnecessary herein.

Figure 1:
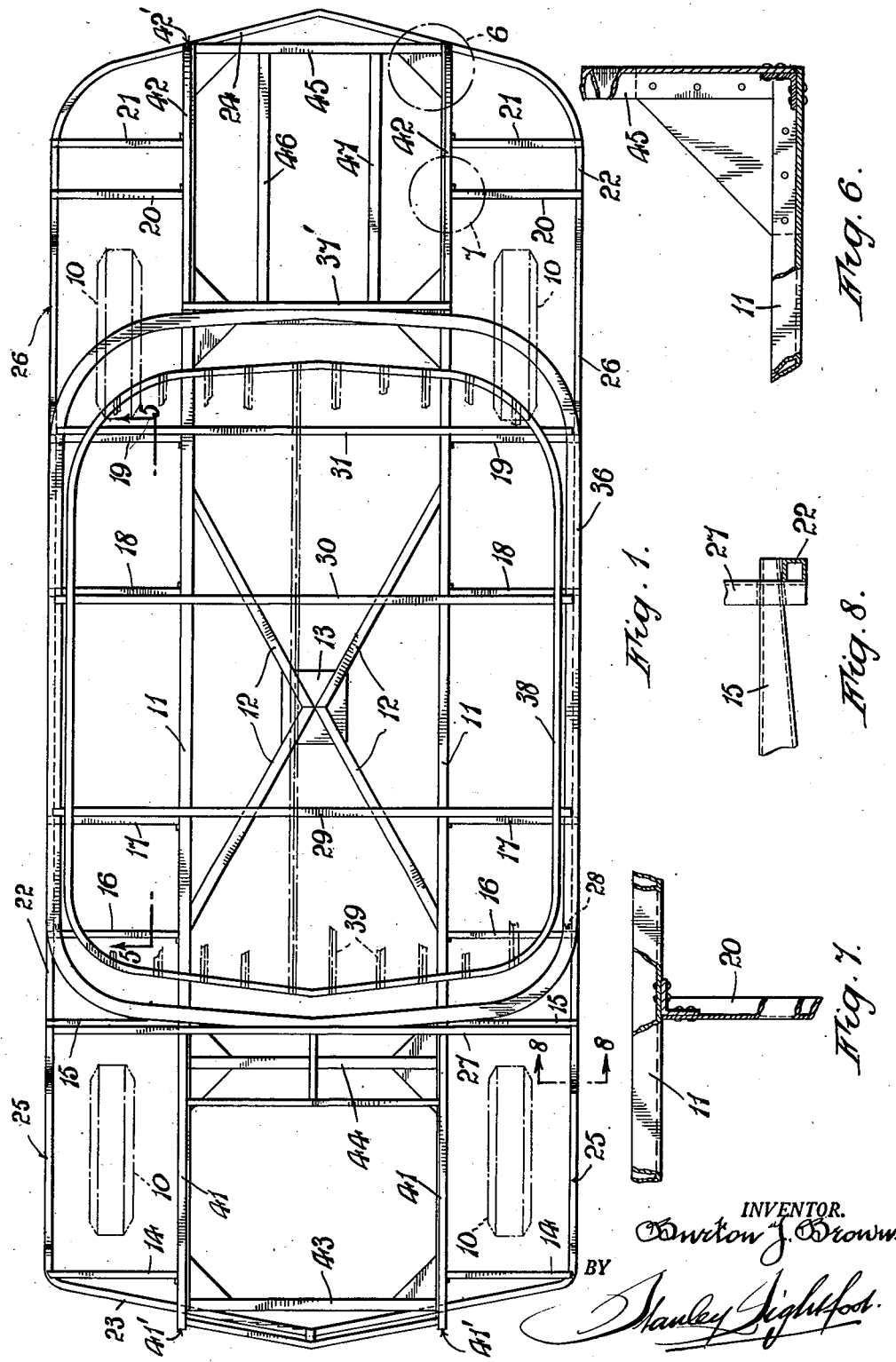
Figure 1 is a plan of an automobile body frame construction embodying the said invention, the roof members being only partially shown in broken lines so that they will not obscure the underlying structure.
Figure 2:
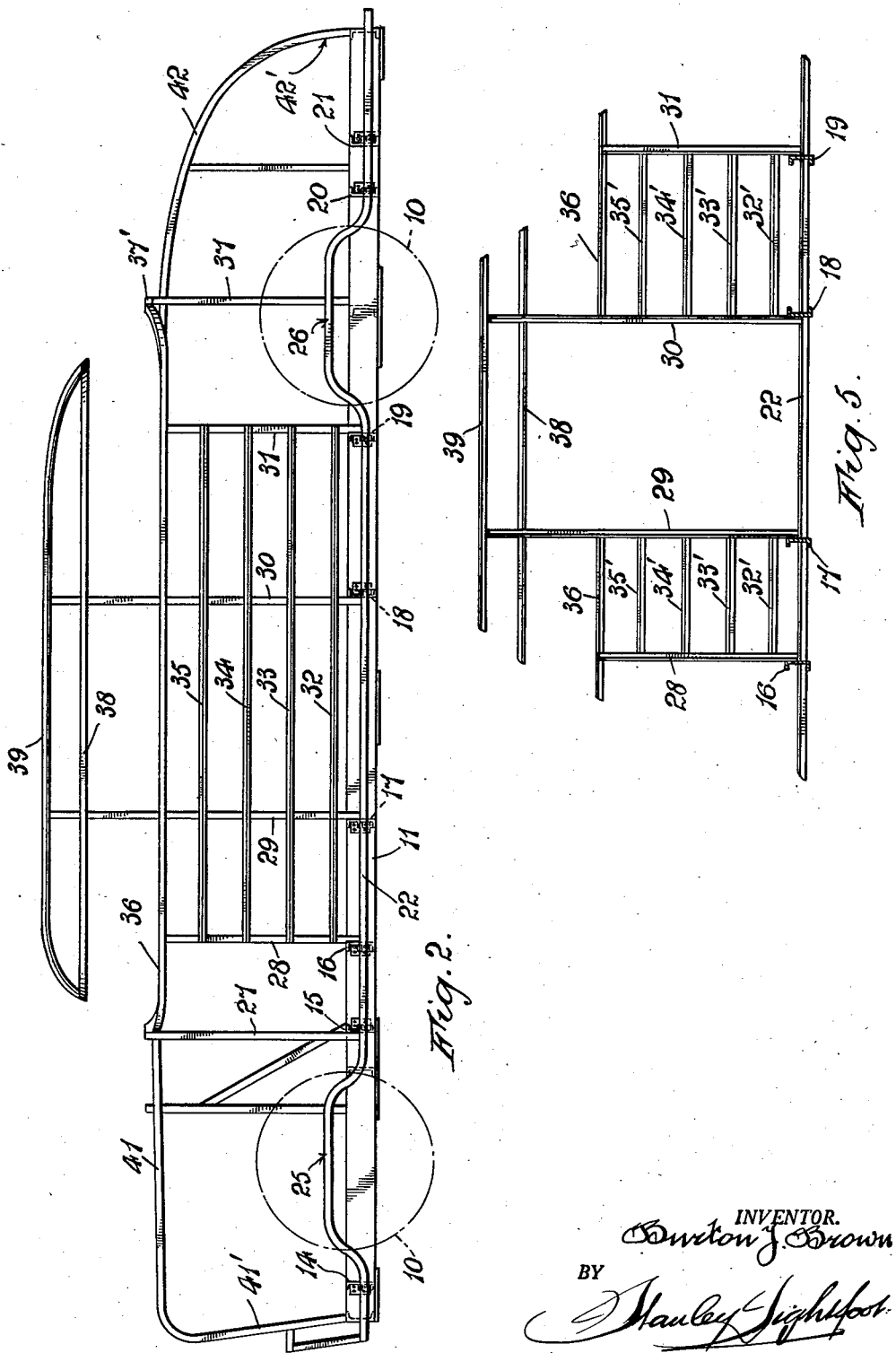
Figure 2 is a left side elevation of the said body frame.
Figure 3:
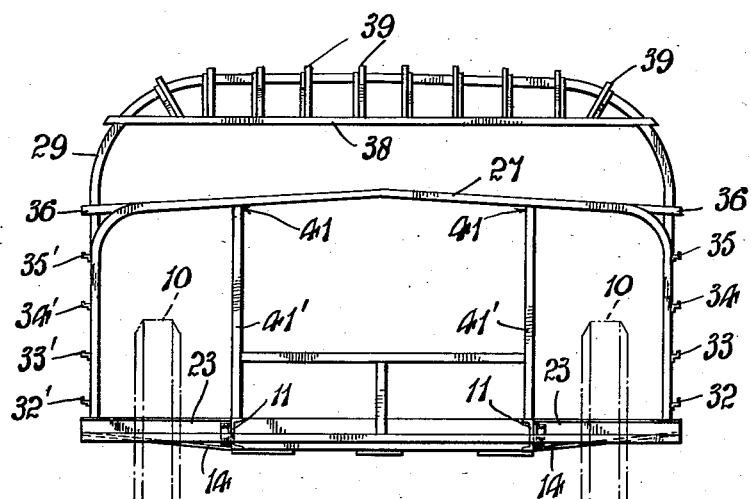
Figure 3 is a front end elevation of the same showing only the elements forming the front half of the frame.
Figure 4:
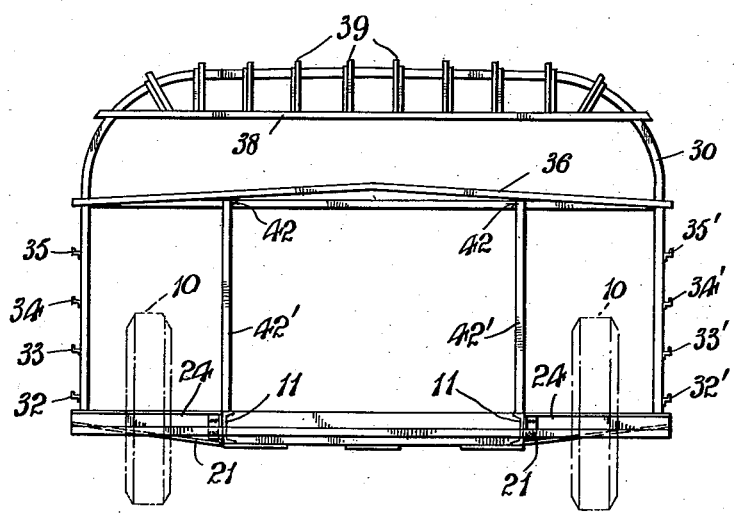
Figure 4 is a rear end elevation of the same showing only the elements forming the rear half of the frame.

Extending outwardly and laterally from each of the longitudinal members 11 are a plurality of cantilever elements of channel sections 14, 15, 16, 17, 18, 19, 20, and 21, the outer ends of which extend over and are connected to and support the lower body side members 22 as shown in Fig. 8 of the drawings. The front and rear ends of these members 22 are bent inwardly, as at 23 and 24, to meet and define the front and rear ends of the outer body frame, as will be clearly seen from an examination of Figure 1. The drawings show these side members 22 as being situated materially outside of the wheel 10 positions, so that in the completed body the said wheels would be situated well within the side walls of the body as will be clearly apparent.

In the vicinity of the wheel positions the said side members 22 are shown as being bent or bowed upwardly, as at 25 and 26, to provide for recesses or openings in the lower parts of the side walls of the body to afford access to the wheels for their removal and replacement.

The outer ends of the said cantilever members 15, 17, 18, and 19 also support the opposite lower ends of arched channels 27, 29, and 30, the legs of the said arched channels 29 and 30 having in turn mounted thereon Z section horizontal members 32, 33, 34, and 35 arranged in spaced relation one above the other to connect and brace the legs of the said arched members 29 and 30 and to form the framework and support for the outer paneling of the body (which paneling is omitted from the drawings for reasons of clarity in illustrating the structural frame assembly). As shown in the example Figure 8, the extremities of the legs of the said arch members cross and project below the cantilever ends to which they are secured, the side member 22 being accommodated in the resulting angle formed between the projecting ends of the cantilever and arch members.

It is proposed to extend these horizontal members 32 to 35, inclusive, directly from a vertical supporting member 28 to a further vertical supporting member 31 on the left hand or "off" side of the car and, on the right, or near, side of the car body, simply use shorter similar members 32', 33', 34', and 35' extending between arched channel 29 and the vertical member 28, and also between the arched channel 30 and the vertical member 31, so that the space between the arched channels 29 and 30 may be left open, as shown in Figure 5, in order to provide for the hanging of a door in such opening.

Spaced above the horizontal side members 35, and at the window sill level of the car, is the upper body channel 36 extending around and embracing the structure formed by the arch-shaped members 29 and 30, the said body channel 36 thereby being in the form of a C-shaped structure with its ends terminating at the door opening. The overall length of this C-shaped member extends from the top of the arched channel 27 to a transverse member 37' spanning the upper ends of the vertical supports 37. Still further spaced above the level of the said channel 36, and at what is to constitute the upper limits of the windows, is the lower roof rail 38 similar in outline to the channel 36 but somewhat smaller as will be seen from an examination of Figure 1. This rail 38 is attached to the ends of Z-type roof members 39 as clearly shown, the intermediate portions of the said roof members 39 being supported on the upper horizontal portions of the arch-shaped members 29 and 30.

As a support for the hood and adjacent elements of the body proper, members 41 are shown as extending forwardly from the upper horizontal portion of the arch-shaped member 27 and then downwardly, as at 41', to the forward ends of the rails 11.

Similarly, at the rear end of the body structure, channel members 42 extend rearwardly and downwardly from the upper portion of the vertical supports 37 to engagement with the rear end of the said rail 11; and these serve to form the ribs of what is ordinarily referred to as the trunk compartment of the body but which, of course, may accommodate the engine or any other mechanism or parts which it may be desirable to house therewithin.

Various other bracing elements, such as shown at 43, 44, 45, 46 and 47, may be utilized to such an extent as deemed necessary or desirable to add rigidity to the structure described or to afford support for flooring or other parts of the car or body which may be considered necessary. Obviously, clip angles and gusset plates may be incorporated in the structure wherever it seems advisable.

It will be seen that the described structure is characterized by an outer wall body frame 22 defining the general outline in plan of the body as a whole, this frame being mounted upon the ends of two main rails 11 intended to carry the load of the body, engine, and passengers, said rails 11 extending longitudinally of the said outer frame in spaced relation to the sides thereof; connection between the said rails and the sides of said frame being afforded by cantilever arms extending therebetween; a series of longitudinally spaced, arched members the legs of which are supported on the ends of said cantilevers, said arched members carrying vertically spaced longitudinal body ribs and a roof structure, which roof structure extends forwardly and rearwardly of the arched members supporting the same to provide canopies freely spaced above the window sill level of the body ribs without corner or other supports or posts whereby unobstructed windows may be accommodated in the said forward and rear spaces and extending entirely around the rear and forward body portions to a marked extent; various structural elements as described being attached in the front and rear ends of the body structure to form the framework for engine and luggage compartment enclosures, and all being supported from the main rails 11 and their associated bracing members in a manner wherein the said rails 11, their associated members, including the cantilevers, arched and other structures will, when the frame work is eventually covered with metal or other sheeting and body equipment, become a part of the body as a whole (as distinguished from the type of body structure which is simply mounted upon and carried by the chassis frame as has been the usual practice heretofore.

It will be understood from the foregoing description that the weight of the car engine, gear box, associated mechanical parts, as well as that of the passengers, will be carried by the body structure described and not independently of the body structure as has been the practice.

This invention may be developed within the scope of the following claims without departing from the essential features of the said invention, and it is desired that the specification and drawing be read as being merely illustrative of a practical embodiment of the same and not in a strictly limiting sense.

What I claim is:

1. In a car body frame of the type described having a unitary side, top and floor framework, the combination of, main load-supporting rails extending from end to end of said structure, cantilevers extending laterally at spaced intervals from each of said rails, and arched members mounted on the ends of certain of said cantilevers intermediate the length of said rails, the ends of said cantilevers and said arched members crossing and projecting, the lower peripheral portion of the unitary framework being secured in the angle formed between the projecting ends of said cantilevers and said arched members.

2. In a car body of the type described having a unitary side, top and floor framework the combination of, main load-supporting rails extending from end to end of said framework, cantilevers extending laterally at spaced intervals from each of said rails, arched members mounted on the ends of certain of said cantilevers intermediate the length of said rails, a window sill member around the car body frame from one side of a doorway to the other side of said doorway and embracing said arched members, a roof structure carried by said arched members and spaced above said sill member, and horizontal members of Z section connecting said arched members at vertically spaced intervals below said sill member with the face of one of the legs of each Z member presented and secured to said arched members.

3. In a car body of the type described having a unitary side, top and floor framework the combination of, main load-supporting rails extending from end to end of said framework, cantilevers extending laterally at spaced intervals from each of said rails, arched members mounted on the ends of certain of said cantilevers intermediate the length of said rails, a window sill member around the car body frame extending from one side of a doorway to the other side of said doorway and embracing said arched members, a roof structure carried by said arched members and spaced above said sill member, horizontal members of Z section connecting said arched members at vertically spaced intervals below said sill member with the face of one of the legs of each Z member presented and secured to said arched members, and Z section members in horizontally spaced intervals extending over the upper horizontal portions of said arched members and similarly secured thereto.

BURTON J. BROWN.

REFERENCES CITED

The following references are of record in the file of this patent:

UNITED STATES PATENTS

| Number | Name | Date |
|---|---|---|
| 675,876 | Anderson | June 11, 1901 |
| 2,028,184 | Bergholt | Jan. 21, 1936 |
| 2,119,655 | Stout | June 7, 1938 |
| 2,155,147 | Nelson | Apr. 18, 1939 |
| 2,349,940 | Craig | May 30, 1944 |

FOREIGN PATENTS

| Number | Country | Date |
|---|---|---|
| 210,698 | Switzerland | Oct. 16, 1940 |